United States Patent [19]

Raymond

[11] Patent Number: 4,878,263
[45] Date of Patent: Nov. 7, 1989

[54] CONNECTOR DEVICE TO MOUNT A WINDSHIELD WIPER CONTACT CLIP, AND CLIP ENDOWED WITH SUCH A CONNECTOR DEVICE

[75] Inventor: Bernard Raymond, Paris, France

[73] Assignee: Valeo Systemes D'Essuyage, Issy-Les-Moulineaux, France

[21] Appl. No.: 190,822

[22] Filed: May 6, 1988

[30] Foreign Application Priority Data

May 6, 1987 [FR] France ............................. 87 06382

[51] Int. Cl.$^4$ .............................................. B60S 1/40
[52] U.S. Cl. ................................................ 15/250.32
[58] Field of Search ........................ 15/250.32–250.42

[56] References Cited

U.S. PATENT DOCUMENTS 4,179,767 12/1979 Weiler et al. .

FOREIGN PATENT DOCUMENTS

| 0158991 | 10/1985 | European Pat. Off. . |
| 2930680 | 2/1981 | Fed. Rep. of Germany ... 15/250.32 |
| 3208235 | 9/1983 | Fed. Rep. of Germany . |
| 1414690 | 11/1964 | France . |
| 2306855 | 11/1976 | France . |
| 2014040 | 8/1979 | United Kingdom . |
| 2034580 | 6/1980 | United Kingdom ............ 15/250.32 |

*Primary Examiner*—Peter Feldman
*Attorney, Agent, or Firm*—Wenderoth, Lind & Ponack

[57] ABSTRACT

A connector device (C) for mounting a clip (E) of a windshield wiper contact portion on a curved end (2) of an arm comprises a component (1) having a substantially U-shaped longitudinal profile with two legs (7, 8) designed to lodge in the concave part of the curved end (2) of the arm. Component (1) comprises mechanism (A) for attaching the component to arm (3) and a mechanism (R) for receiving a shaft (6) on the side opposite the base of the U. The length (1) of one leg (7) of the U intended to be placed against the arm (3) is greater than the length (h) of the other leg (8) of the U intended to be placed against the curved part (9) of the end of the arm. Attachment mechanism (A) comprises at least one initial fastening component (14) towards an end (13) of the longer leg (7) of the U intended to cooperate with a complementary component (15) provided on the arm (3), the longer leg (7) comprising at its end a gripping device designed to project transversely from the arm.

14 Claims, 2 Drawing Sheets

CONNECTOR DEVICE TO MOUNT A WINDSHIELD WIPER CONTACT CLIP, AND CLIP ENDOWED WITH SUCH A CONNECTOR DEVICE

BACKGROUND OF THE INVENTION

The present invention pertains to a connector device for mounting a windshield wiper contact clip on the curved end of an arm, the clip having an opening for passage of the end of the arm, with a transverse shaft extending across the opening for a hinged connection of the arm and the clip. The connector device may comprise a component having a substantially U-shaped longitudinal profile, with two legs, designed to lodge in the concave part of the curved part of the curved end of the arm, with a longer leg intended to be placed against the arm, while a shorter leg is to be placed against the curved part of the arm, with the component having an arrangement for fastening it to the arm and a mechanism for receiving the shaft on the side of the component opposite the base of the U and arranged to allow the shaft to be introduced into the receiving mechanism and to hold it.

This arrangment allows the assembly and disassembly of the windshield wipercontact clip by only slightly raising the curved arm, which is especially advantageous in the case of non-removable arms.

Connector devices of this type proposed up to now allow the shaft of the clip to be mounted in the connector with relative ease. On the other hand, it is more difficult to assemble and disassemble the connector with respect to the windshield wiper arm. Moreover, components making up the connectors have relatively complicated shapes, in order to acomplish the desired functions, resulting in a relatively high production cost. These components are generally made of plastic material, and their production costs depend largely on the costs involved in making the mold, which increases the more complex the shape becomes. Components are often fragile due to their complexity.

Most often, the mechanism to disengage the connector from the arm protrudes, and can cause injuries.

SUMMARY OF THE INVENTION

The present invention chiefly has the object of providing a connector device as described above, which meets the various practical requirements better than those proposed up to now, and which especially is of a simple and sturdy design allowing easy and quick assembly and disassembly not only of the shaft of the clip in the connector, but also of the connector equipped with the clip on the curved end of the arm.

According to the invention, a connector device for mounting a windshield wiper contact clip on the curved end of an arm of the type defined above is characterized by the fact that the longer leg is intended to be placed against the arm, while the shorter leg is intended to be placed against the curved part of the end of the arm. The mechanism to attach the connector device to the arm comprises at least one component on the leg intended to cooperate with a complementary component on the inner surface of the arm. The leg comprises at its end a gripping device designed to project transversely from the arm.

The opening of the clip is generally limited on either side by walls projecting from the base of the clip on the side opposite the surface to be wiped, with the shaft being mounted between the walls.

The invention also pertains to a windshield wiper contact assembly, and its corresponding clip, whose transverse shaft is endowed with a connector device as defined above.

Apart from the provisions disclosed above, the invention consists of a certain number of other arrangements, which will be discussed in greater detail below with respect to specific embodiments described in reference to the attached drawings, provided on a purely non-limitative basis.

DESCRIPTION OF THE PREFERRED EMBODIMENTS

Figure 1:
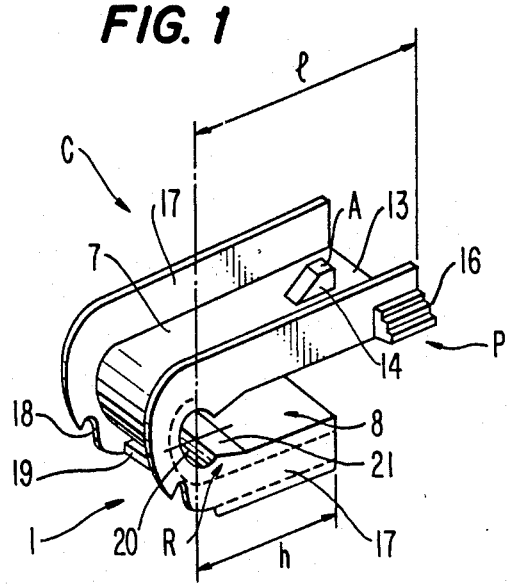
FIG. 1 is a perspective view of a connector device according to the present invention.

With reference to these drawings, especially to FIG. 1, a connector device C comprises a component 1 having a substantially U-shaped longitudinal profile, with two legs. Connector device C is used for mounting a windshield wiper contact clip E (FIG. 2) on an end 2 of a windshield wiper arm 3. End 2 is curved towards a surface to be wiped (not shown), so that it has the shape of a hook located between the arm 3 and a surface to be wiped.

In a conventional manner, especially via compensators (not shown), clip E holds a wiper blade made of a flexible material (not shown), intended to rub against the surface to be wiped. The clip E is generally composed of a strip having a U-shaped cross section, with its concave part turned towards the surface to be wiped. Clip E has an opening 5, substantially at the midpoint of a base wall 4 thereof, through which the end 2 of the arm can pass. A transverse shaft 6 extends across the opening 5 to provide a hinged connection between arm 3 and clip E.

Component 1 of the connector device is designed to lodge in the concave section of curved end 2 of the arm. Component 1 has a mechanism A for fastening the component to the arm, and a mechanism R for receiving shaft 6, with the receiving mechansim R opening on the side opposite the base of the U-shaped longitudinal profile of component 1.

Figure 2:
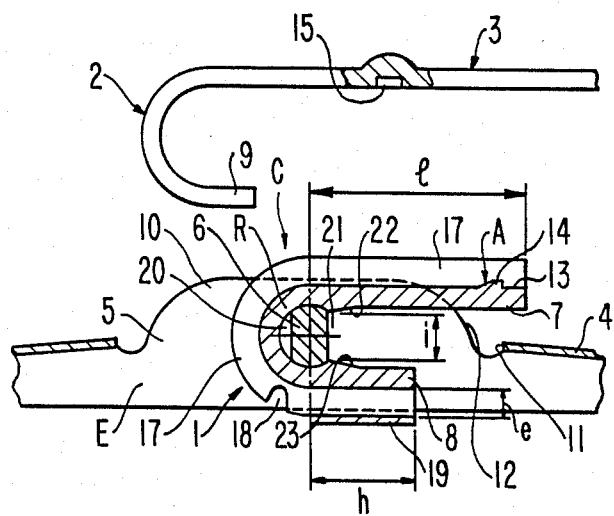
FIG. 2 is a longitudinal cross-sectional view of the connector device of FIG. 1, ready to be mounted on a curved end of an arm, showing part of a windshield wiper contact clip.

A leg 7 of the U of component 1, intended to be placed against arm 3, has a length l greater than length h of an other leg 8, intended to be placed against a curved part 9 of end 2 of the arm. As can be seen in FIG. 2, lengths l and h are measured from a plane orthogonal to legs 7 and 8, passing through the zone of connection between the semicircular base of component 1 and each leg.

Opening 5 of clip E is limited on either side by walls 10, projecting from the side opposite the surface to be wiped, with respect to the base wall 4 of the clip. Transverse shaft 6 is placed between the walls 10 and is fastened, as by crimping, at each end in an opening in the wall. Length 1 of leg 7 is advantageously chosen so that, when shaft 6 is engaged in component 1, leg 7 extends longitudinally beyond a transverse edge 11 of opening 5, and beyond a rear edge 12 of walls 10. Thus, a rear end 13 of leg 7 is located outside of walls 10 and is easily accessible.

Fastening device A comprises at least one initial fastening component composed of a detent in FIGS. 1 and 2, located towards the end 13 of leg 7. Detent 14 projects from the outside surface of leg 7; its surface has a slight slope on the side corresponding to the assembly of component 1 in concave part 2, and, on the other side, has an abrupt surface, substantially orthogonal to leg 7, to ensure attachment to the arm.

Detent 14 is intended to cooperate with a complementary component consisting of a notch 15 provided on the inside surface of arm 3. Notch 15 can be composed of a sleeve, wherein the outside surface of arm 3 has a bulge, as is the case in FIG. 2, a puncture, or an opening issuing on the outer surface of arm 3.

The longitudinal positions of detent 14 and notch 15 are chosen so that the two components cooperate when the semi-circular convex base of component 1 comes to press against the concave semi-circular base of curved end 2.

Leg 7, the longer leg of component 1, comprises at its rear end 13 a gripping device P designed to project transversely from the arm. The gripping device P is advantageously composed of, on each side, a boss 16 (FIG. 1), located outside of walls 10 when the component 1 is mounted on the shaft 6 (FIG. 2).

On each side, component 1 comprises an edge 17 constituting a substantially orthogonal end plate at legs 7, 8 of the component. The end plates 17 thus formed are intended to frame end 2 of the arm.

Gripping device P is included in the overall space requirement of end pieces 17. In other words, following a direction orthogonal to the midplane of leg 7, the device P does not project beyond the edge of end plates 17.

An indentation 18 is provided in each end plate 17 near the area where the convex part of the end plate and the rectilinear part connect, to make component 1 sufficiently flexible so that shaft 6 may enter receiving mechanism R. The indentation 18 is advantageously provided on the side of small leg 8 of the U.

End plates 17 can be connected transversely in the area of the small leg 8 of the U, by a catch 19 (FIG. 2) spaced a sufficient distance e away from the outside surface of leg 8 to allow the passage of the curved part 9 of arm 3.

Receiving mechanism R provided in component 1 is composed of a cylindrical housing 20 having a circular cross section opening towards the back of an entry portion 21. The diameter of the housing 20 is equal to that of shaft 6; conversely, the transverse dimension i of entry 21 is smaller than the diameter of shaft 6.

Shaft 6 is introduced into housing 20 by elastic deformation of component 1, which, in closing up, clips shaft 6 in housing 20.

A guide zone to entry portion 21 is provided on the inside surfaces of legs 7 and 8. The guide zone is defined by two surfaces 22, 23, converging towards the entry portion 21.

Component 1 is mounted on clip E as the immediate result of the above explanations. The assembly is obtained by engaging shaft 6 between the inside surfaces of legs 7 and 8 and exerting enough pressure to cause the elastic deformation of component 1, coming into contact via surfaces 22 and 23 with shaft 6.

When shaft 6 has entered housing 20, component 1 resumes its normal shape and shaft 6 is held in the component. Shaft 6 can be removed by exerting enough pressure to cause component 1 to deform again.

The assembly composed of clip E and component 1 is mounted on arm 3 by passing the clip component 1 under arm 3, so that the component 1 is behind curved end 2.

The curved end 2 is introduced into opening 5 of the clip, then pressure is exerted on the clip and component 1 to engage them by translation into the concave part of end 2, until detent 14 engages in notch 15.

Curved part 9 lodges in the space between catch 19 and leg 8.

It is to be noted that the clip endowed with component 1 can be put into place practically without having to raise arm 3 to move it away from the surface to be wiped.

Disassembly can be done easily by acting on bosses 16 to push back leg 7 and disengage detent 14 from notch 15. Simultaneously, traction is exerted towards the rear to disengage component 1 from curved end 2.

The disassembly process is easy, because bosses 16 located on either side of arm 3 are directly accessible from the far side of the surface to be wiped.

Figure 3:
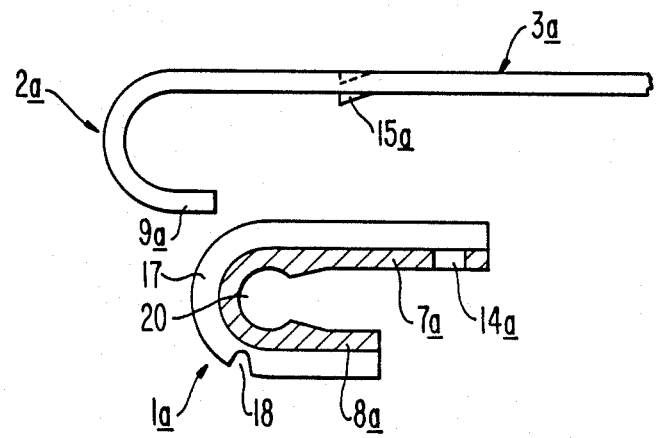
FIG. 3 is a longitudinal cross-sectional view of a second embodiment of the present invention, showing part of the arm.

FIG. 3 shows a different embodiment, according to which component 1a comprises a fastening mechanism made up of an opening 14a provided in the end of the longer leg. The complementary fastening mechanism provided on arm 3a is composed of a detent 15a, produced especially by embossing, projecting on the inside surface of the arm.

In FIG. 3, component 1a has no catch connecting the end plates at the shortest leg.

The parts of component 1a identical to the parts described above in connection with FIG. 1 and 2 are designated with the same reference numbers, followed by the letter a, if applicable, without repeating their description.

Figure 4:
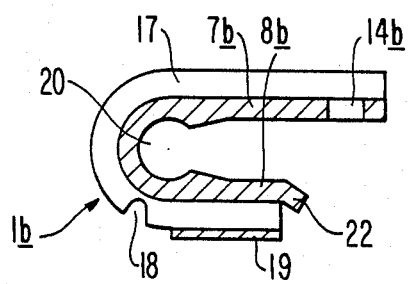
FIG. 4 is a longitudinal cross-sectional view of still another embodiment of the present invention.

The different embodiment in FIG. 4 shows a connector device component 1b comprising a fastening mechanism made up of an opening 14b similar to the one provided in FIG. 3.

Component 1b comprises a catch 19 similar to the one in FIGS. 1 and 2.

The rear end of the shorter leg 8b comprises an extension made up of a tongue 22 inclined away from the connector.

The presence of a catch 19 makes supplementary attachment of the shorter leg to the inside surface of the curved part 9 of the arm impossible.

Conversely, in the embodiment in FIG. 3, it would be possible to provide a fastening mechanism towards the end of shorter leg 8a, on the outer surface of the leg, to cooperate with a complementary fastening mechanism provided on the inside surface of part 9a of the arm. In this case, branch 8a would be extended by a tongue similar to tongue 22 in FIG. 4, to allow the fastening mechanism of component 1a to be separated from the complementary mechanism provided on the arm. The fastening mechanism for component 1a may be composed of a detent an the complementary mechanism provided on part 9a of the arm may be composed of an opening or recess.

Regardless of the embodiment, the component of the connector device according to the invention is of simple and sturdy design. Component shapes are not complicated, so that molding with plastic material does not require an excessively complicated or costly mold. Moreover, the component has no particularly fragile areas.

The shaft of the clip is easy to assemble and disassemble. Likewise, the component can be put on and taken off the windshield wiper arm easily.

I claim:

1. A connector device for mounting a windshield wiper contact clip on a curved end of a wiper arm, the windshield wiper contact clip comprising a clip body having a pair of upstanding walls and a pair of transverse edges defining an opening in the clip body, the windshield wiper contact clip further comprising a transverse shaft extending across the opening between the pair of upstanding walls, said connector device comprising:

a substantially U-shaped connector body for receiving a concave portion of the curved end of the wiper arm therearound, said substantially U-shaped connector body comprising a first leg, a second leg, and a curved base interconnecting said first and second legs;

fastening means on said connector body for fastening said connector body to the wiper arm, said fastening means comprising a first component on said first leg adapted for cooperation with a complementary component on the wiper arm;

receiving means on an inside portion of said curved base of said substantially U-shaped connector body for receiving and holding the transverse shaft of the windshield wiper contact clip;

said first leg comprising gripping means at a distal end thereof projecting transversely therefrom, and said first leg having a length greater than the length of said second leg and greater than the distance from the transverse shaft of the clip body to one of the transverse edges of the clip body, such that when said connector body holds the transverse shaft said first leg will extend beyond the transverse edge of the clip body so that said gripping means will be located beyond the longitudinal extent of the upstanding sidewalls of the clip body.

2. The connector device as set forth in claim 1, wherein:

said substantially U-shaped connector body further comprises a pair of upstanding edge portions extending on opposite sides of said connector body along substantially the entire extent thereof, said upstanding edge portions adapted to receive and frame the curved end of the wiper arm when the wiper arm is connected to said connector body, and each said upstanding edge portion having an indentation therein substantially at a connecting point between said curved base and one of said first and second legs, to thereby render said connector body sufficiently flexible such that the transverse shaft of the clip body can be received and held by said receiving means.

3. The connection device as set forth in claim 2, wherein:

said transversely extending gripping means is located on said first leg at a position below the upper edge of said upstanding edge portions.

4. The connector device as set forth in claim 2, wherein:

said indentations of said upstanding edge portions are provided substantially at the connecting point between said curved base and said second leg.

5. The connector device as set forth in claim 2, wherein:

said upstanding edge portions are transversely connected along said second leg by a catch member.

6. The connector device as set forth in claim 2, wherein:

said receiving means comprises a shaft housing portion, a shaft entry portion having a width smaller than the diameter of the transverse shaft of the clip body, and a shaft entry portion guide area converging toward said shaft entry portion.

7. The connector device as set forth in claim 1, wherein:

said gripping means comprises a boss disposed on each side of said first leg.

8. A mounting device for mounting a windsheld wiper to a curved end of a wiper arm, said mounting device comprising:

a windshield wiper contact clip, said windshield wiper contact clip comprising a clip body having a pair of upstanding walls and a pair of transverse edges defining an opening in said clip body, said windshield wiper contact clip further comprising a transverse shaft extending across said opening between said pair of upstanding walls;

a connector device having a substantially U-shaped connector body for receiving a concave portion of the curved end of the wiper arm therearound, said substantially U-shaped connector body comprising a first leg, a second leg, and a curved base interconnecting said first and second legs;

fastening means on said connector body for fastening said connector body to the wiper arm, said fastening means comprising a first component on said first leg adapted to cooperate with a complementary component on the wiper arm;

receiving means on an inside portion of said curved base of said substantially U-shaped connector body for receiving and holding said transverse shaft of said windshield wiper contact clip;

said first leg comprising gripping means at a distal end thereof projecting transversely therefrom, and said first leg having a length greater than the length of said second leg and greater than the distance from said transverse shaft of said windshield wiper contact clip to one of said transverse edges of said clip body, such that when said connector body holds said transverse shaft said first leg extends beyond the transverse edge of said clip body and said gripping means is located beyond the longitudinal extent of said upstanding sidewalls of said clip body.

9. The mounting device as set forth in claim 8, wherein:

said substantially U-shaped connector body further comprises a pair of upstanding edge portions extending on opposite sides of said connector body along substantially the entire extent thereof, said upstanding edge portions adapted to receive and frame the curved end of the wiper arm when the wiper arm is connected to said connector body, and each said upstanding edge portion having an indentation therein substantially at a connecting point between said curved base and one of said first and second legs, to thereby render said connector body sufficiently flexible such that said transverse shaft of said clip body can be received and held by said receiving means.

10. The connection device as set forth in claim 9, wherein:
   said transversely extending gripping means is located on said first leg at a portion below the upper edge of said upstanding edge portion.

11. The mounting device as set forth in claim 9, wherein:
   said indentations of said upstanding edge portions are provided substantially at the connecting point between said curved base and said second leg.

12. The mounting device as set forth in claim 9, wherein:
   said upstanding edge portions are transversely connected along said second leg by a catch member.

13. The mounting device as set forth in claim 9, wherein:
   said receiving means comprises a shaft housing portion, a shaft entry portion having a width smaller than the diameter of said transverse shaft of said windshield wiper contact clip, and a shaft entry portion guide area converging toward said shaft entry portion.

14. The mounting device as set forth in claim 8, wherein:
   said gripping means comprises a boss disposed on each side of said first leg.

* * * * *